Jan. 24, 1967  J. A. MASINO  3,299,882
PHYSIOLOGIC FLUID PRESSURE SENSOR MOUNT
Filed Oct. 25, 1963  3 Sheets-Sheet 2
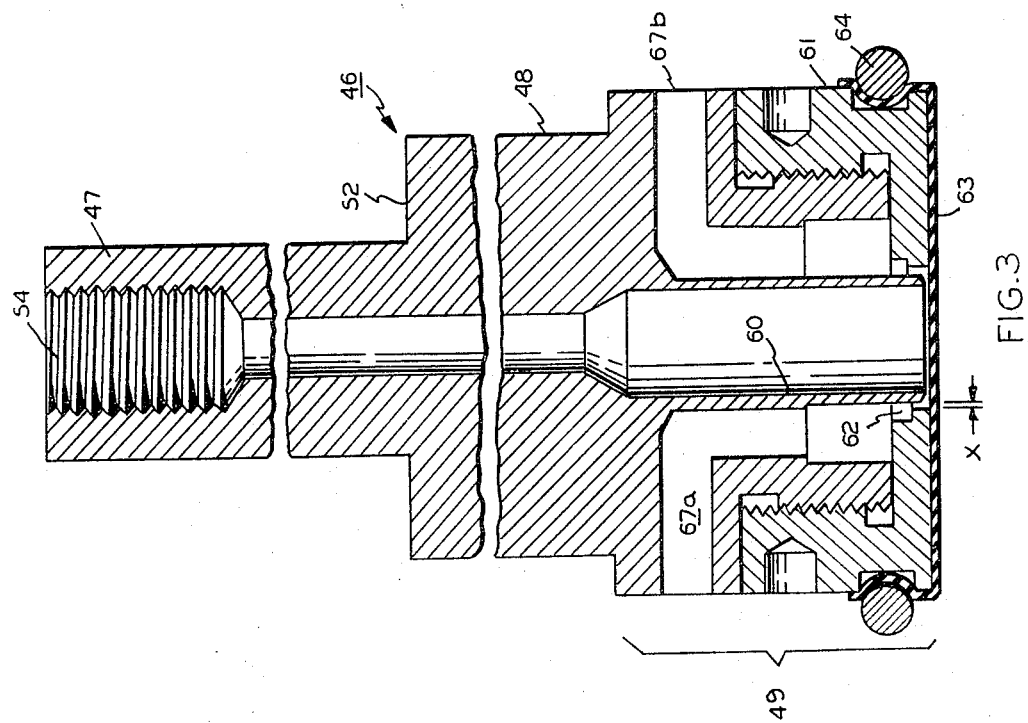
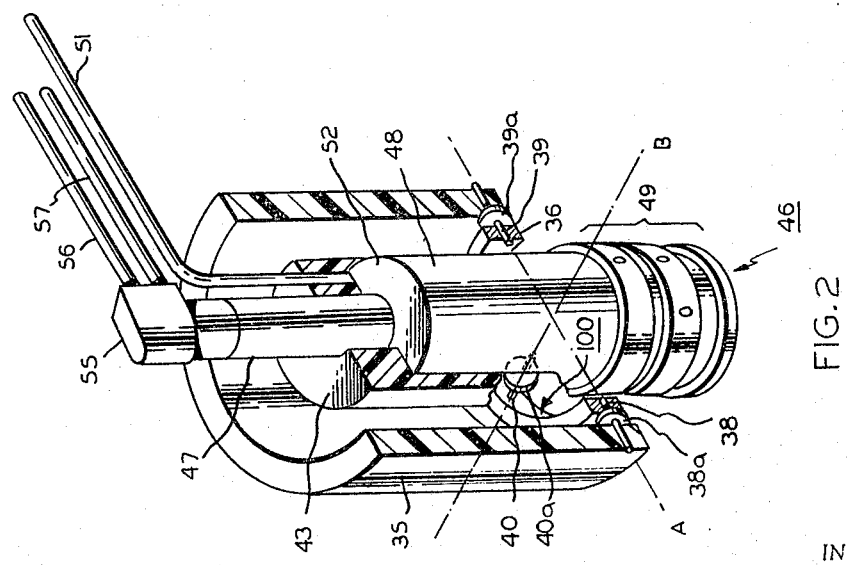
INVENTOR
JOHN A. MASINO
BY  *Harry J. McCauley*
ATTORNEY Jan. 24, 1967     J. A. MASINO     3,299,882
PHYSIOLOGIC FLUID PRESSURE SENSOR MOUNT
Filed Oct. 25, 1963     3 Sheets-Sheet 3
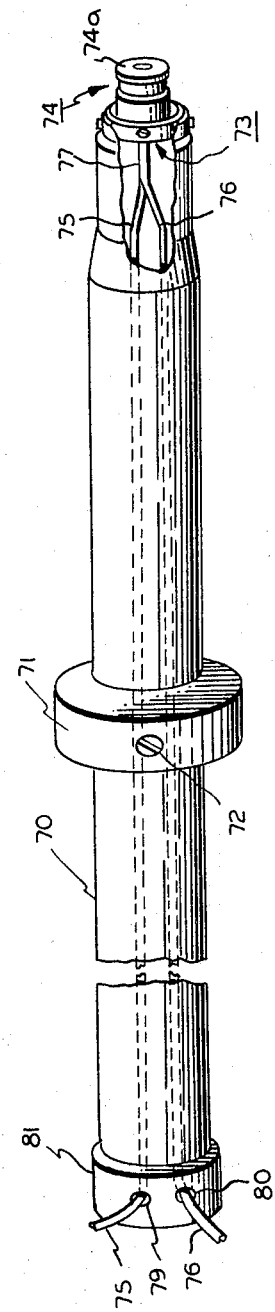
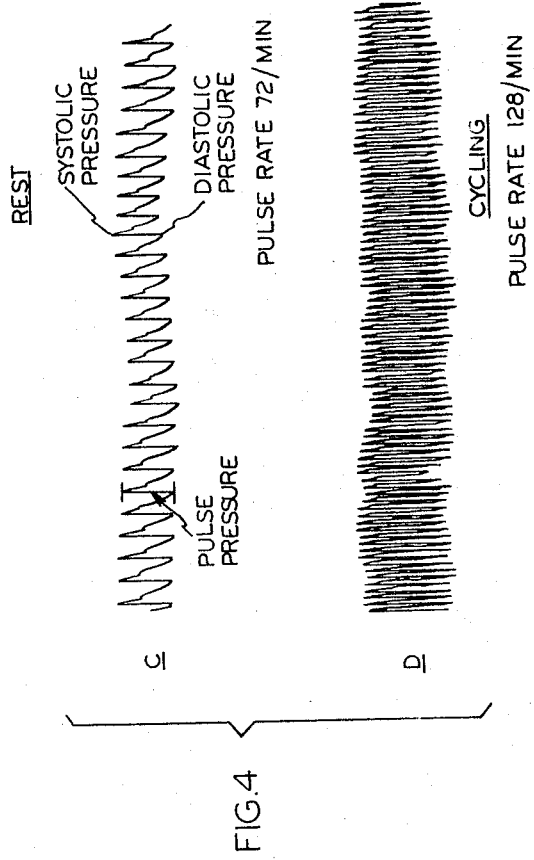
INVENTOR
JOHN A. MASINO
BY *Harry J. McCauley*
ATTORNEY

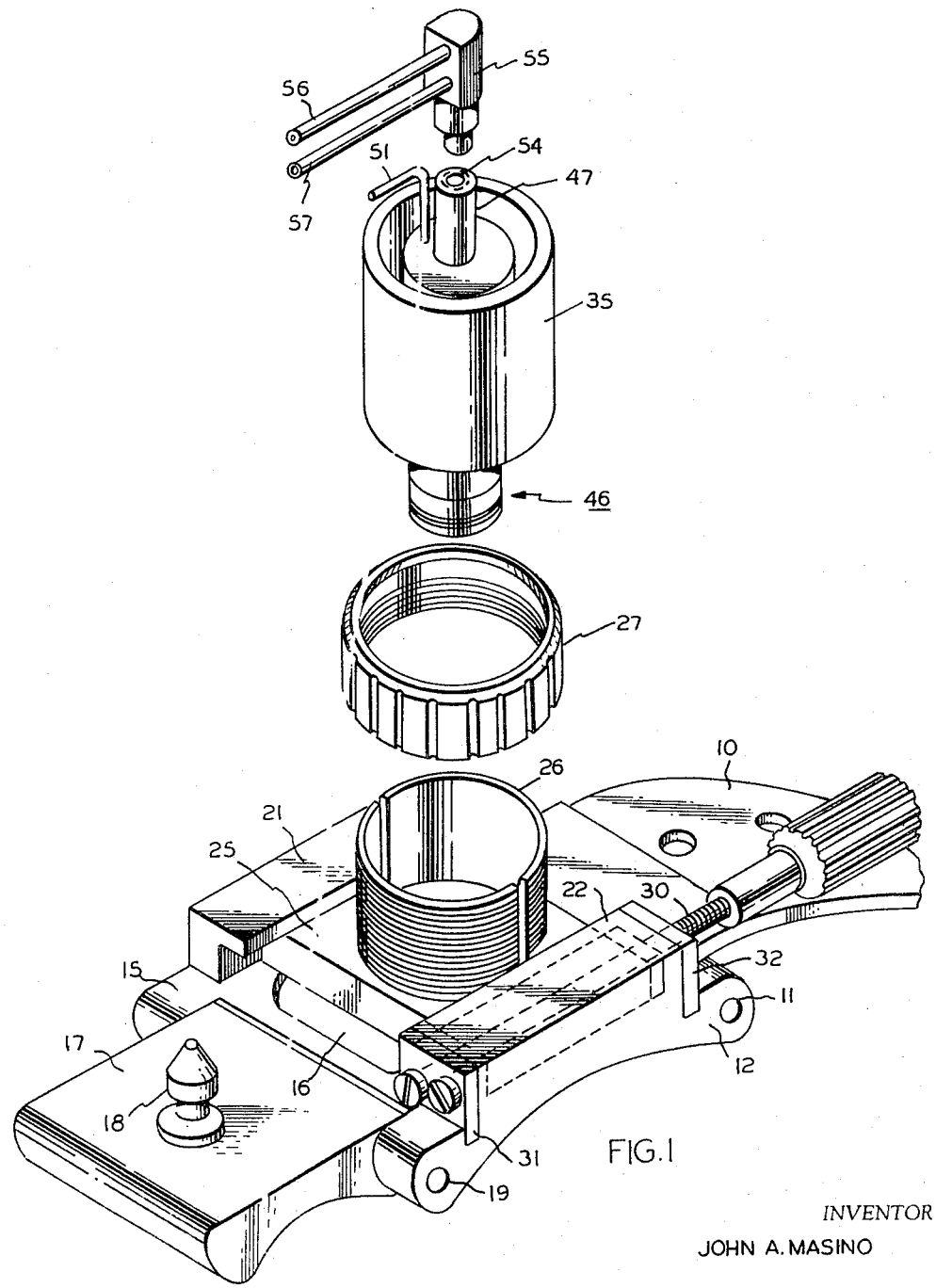

United States Patent Office 3,299,882
Patented Jan. 24, 1967

3,299,882
PHYSIOLOGIC FLUID PRESSURE SENSOR MOUNT
John A. Masino, Wilmington, Del., assignor to E. I. du Pont de Nemours and Company, Wilmington, Del., a corporation of Delaware
Filed Oct. 25, 1963, Ser. No. 318,897
3 Claims. (Cl. 128—2.05)

This invention relates to a physiologic fluid pressure sensor mount, and particularly to such a mount employing a gimbal ring retainer for the sensor permitting ready, self-conforming acommodation of sensor contacting with the surface of the body in confrontation therewith.

The mount of this invention was particularly developed as a support for the physiologic fluid pressure sensing head, hereinafter referred to as "sensor," of U.S. Patent 3,099,262 and is described in a preferred embodiment with reference to such a design, although it is obviously applicable to other apparatus employed in similar service.

An object of this invention is to provide an apparatus which enables nearly frictionless self-conforming accommodation of a physiologic fluid pressure sensor to the body site at which a physiologic fluid pressure measurement is to be obtained, thereby eliminating discomfort to the patient or subject in test and, at the same time, insuring accuracy in the pressure determination. Other objects of this invention are to provide a sensor mount which is quite insensitive to linear accelerations or decelerations which contribute spurious transients complicating body fluid pressure measurement, particularly in strenuous activities such as space flights, and to provide a light-weight, small-size device which hampers the wearer's freedom of movement to a minimum. The manner in which these and other objects of this invention are attained will become clear from the following detailed description and the drawings, in which:

FIG. 1 is an exploded perspective view of a preferred embodiment of apparatus according to this invention intended for blood pressure measurement by application to the radial artery of the human wrist, FIG. 2 is a vertical sectional view of the housing-sensor sub-assembly of the apparatus of FIG. 1, with the sensor shown in full, FIG. 3 is a vertical sectional view of the sensor component solely of the sub-assembly of FIG. 2, FIG. 4 is a reproduction of typical blood pressure wave forms obtained with the device of FIGS. 1-3, inclusive, and FIG. 5 is a perspective view of a tonometer constructed according to this invention, with the front end of the housing partially cut away to better show the details of sensor attachment.

Generally, the mount of this invention comprises, in combination, a rigid housing provided with a through-going bore, a physiologic fluid pressure sensor having at one end a substantially flat presser face formed at right angles to the longitudinal axis of the sensor adapted to contact the body member within which physiologic fluid pressure measurement is to be effected, and a gimbal ring sensor retainer disposed intermediate the bore and the sensor journaled transverse the bore on the outer gimbal axis, with the inner gimbal axis, reserved to sensor retention, oriented perpendicularly to the outer gimbal axis, the gimbal ring sensor retainer spacing the sensor radially with respect to the bore in the plane of the outer gimbal axis.

The invention is first described with reference to a blood pressure measuring device of a type suited to prolonged attachment to a body member, e.g., one required for monitoring service on crew personnel manning a space vehicle. In this instance the site of test chosen for descriptive purposes is the radial artery of the wrist, and attachment to the body is accomplished through the agency of a harness of a size and general design such as used for the ordinary wrist watch. Thus, as shown in FIG. 1, the harness employs an elastomeric strap 10 perforated at convenient spacings and fixedly clamped at one end to terminal pin 11 seated in extension 12 formed integral with stage 15, which is cut through over most of its expanse to present an aperture 16 intended to overlie the body test site.

Stage 15 is preferably molded as a single piece with somewhat concaved undersurface matching the transverse profile of the inside of the wrist from a light-weight, durable polymeric resin, such as one of the polyacetal resins, for example. A polymeric extension piece 17 provided with an integral outwardly facing knobbed stud 18 is hinged on the opposite terminal pin 19 of stage 15, furnishing a slip-over lock for engagement of the strap, perforations when strap 10 is drawn to tight, but comfortable, encirclement around the wrist of the wearer.

The opposite outside lateral edges of stage 15 are curved over at 21 and 22 to form ways snugly receiving slide 25, which therefore overlies aperture 16. Slide 25 is preferably also manufactured from a molded polymer and is provided with an integral vertically disposed nipple 26 threaded externally and split longitudinally at diametrically opposite points to induce circumferential squeeze contraction of the nipple when metal collar 27, machined with a slightly tapered matching internal thread, is screwed thereon. Adjustment of slide 25 along the ways is achieved by cutting rack teeth, not shown, along one slide edge, which teeth engage with the threads of a screw 30 disposed coparallel with the slide edge and pinned against longitudinal movement within miniature pillow blocks 31 and 32 provided at opposite ends of way 22.

The sensor housing 35 in the design portrayed (see FIG. 2) is simply an open cylinder dimensioned to slide snugly longitudinally of nipple 26 before collar 27 is screwed down, but thereafter being held fixedly at any preselected setting longitudinally of the nipple by the squeeze draw-down acompanying collar advance. As seen most clearly in FIG. 2, housing 35 is provided at its forward end, i.e., the end in proximity to the body in test, with a gimbal ring sensor retainer, denoted generally at 100, the ring element 36 of which is secured transverse the housing bore by journaling on diametrically opposed trunnions 38 and 39 threadably engaged with housing 35, constituting the outer axis A, of the gimbal. Ring 36 can typically be made of aluminum, measuring 0.545" O.D. and 0.465" I.D. Spacing washers 38a and 39a fixed on trunnions 38 and 39, respectively, safeguard against lateral drift of ring 36 with respect to the housing bore. The inner axis, B, perpendicular to outer axis A, and preferably coplanar therewith, consists of a similar pair of trunnions, only one of which, namely 40, provided with spacing washer 40a, is shown in FIG. 2, extending inwardly from ring 36, upon the inboard ends of which latter sensor-receiving cylinder 43 is journaled.

In the construction detailed, provision is made for biasing the sensor axially of the gimbal ring sensor retainer under a preselected pressure loading. Thus, the sensor, denoted generally at 46, is constructed in the form of a piston having a reduced diameter, piston rod-like end 47 extending outwardly through a close-fitting drilled passageway in the upper end of cylinder 43, whereas the main body slidable longitudinally within cylinder 43 consists of intermediate cylindrical length 48. Cylinder 43 is open at the lower end, so that the somewhat enlarged sensing extremity 49, of diameter exceeding the bore of cylinder 43, protrudes therefrom within aperture 16, and, therefore, is brought into direct contact with the skin of the test body.

Regulable biasing of sensor 46 longitudinally of cylinder 43 is conveniently effected by compressed air pressure (typically, in the range of 6 to 20 p.s.i. gage) applied via nipple 51, opening into the top of cylinder 43, to which is connected flexible polymeric air supply tubing not shown. This air discharges against face 52 of sensor 46, thereby driving it downwardly in the cylinder to the extent, at least, that compression of the skin and flesh in the wrist test site permits.

Sensor 46, shown to best advantage in FIGS. 2 and 3, is of the general design disclosed in U.S. Patent 3,099,262 and, therefore, is described only briefly herein. The sensor is conveniently fabricated from stainless steel or other metal and is threaded internally at 54 in its upper end to receive screw coupling 55 provided with nipples 56 and 57 adapted to receive the flexible polymeric connection tubing, not shown, in friction-tight attachment therewith. One of these nipples, arbitrarily 56, constitutes the sensor fixed flow rate gas supply, and can be provided with an orifice or similar restriction (typically 0.0065" dia. when used with a 25 p.s.i.g. air supply) to obtain this control. Nipple 57 is reserved (through the intermediacy of a transducer) to continuous measurement of the gas pressure developed within nozzle 60, into the upper end of which both nipples connect. The lower end of the sensor is closed off by screw cap 61 provided with a stepped central circular aperture 62, of diameter substantially less than the projected limits of the blood vessel on which the test measurement is to be made, concentric with the nozzle 60 and spaced therefrom by the distance $x$, typically about 0.014". The outer face of screw cap 61 is preferably closed off by a thin dam rubber diaphragm 63 held in taut, but essentially unstretched tightness, by ring clamp 64 seated in peripheral groove 65 adjacent the front end of the cap. The outer surface of diaphragm 63, backed up by the thickness of cap 61, constitutes the flat sensor presser face which actually contacts the skin at the test site.

Nozzle 60 (typically 0.08" inside diameter at its enlarged end adjacent diaphragm 63) is cut outwardly at an accurate 30° bevel around its discharge end and the clearance between this nozzle peripheral expanse and confronting surfaces of screw cap 61, closing off the lower end of sensor 46, throttles escape of air out of exhaust passages 67a and 67b, opening to the atmosphere. This throttling occurs in such a manner that the air pressure maintained within nozzle 60, and measured by the remotely located transducer in connection therewith via nipple 57, is a function of the blood pressure in test, all as more fully described in U.S. Patent 3,099,262 supra.

The purpose of the design of sensor of Patent 3,099,262 was to compensate automatically for the error-introducing, coexisting compressive effect of the body tissue surrounding a blood vessel, or other chosen test site, during body fluid pressure measurement. This was accomplished by depressing the contacted member, such as the blood vessel in test, to approximately the same degree in successive observations, e.g., to about one fourth of its free state (i.e., uncompressed) circular diameter. Under these circumstances a substantially common limiting horizontal plane was maintained as regards the entire tissue in confrontation with the sensor presser face and gas escape out of nizzle 60 was throttled evenly around the periphery, so that the gas pressure maintained therein, and sensed via nipple 57, was a true measure of the transient level of blood pressure existing within the tested blood vessel.

However, the fluid pressure sensors and transducers employed are so sensitive that even relatively minor variations in placement of the sensor, environmental vibrations, accelerations and decelerations of the test subject and other uncontrollable interferences had a perceptible effect on the measurement. The mount of this invention cures the difficulties by incorporating facilities for highly reproducible locational applications, coupled with self-conforming action by the presser face of the sensor in its contact with the confronting body tissue during test. In addition, the provision of regulable biasing pressure application to the sensor enables compensation for tissue compressibility characteristics of substantially different magnitudes which are encountered in different individuals.

In use, the following procedure proved highly successful. First, the subject's radial artery was located and clearly marked by ball point pen lines drawn on the skin from a point about 1" back from the line of flexure between hand and lower arm. The harness, free of the sensor and its housing, was then placed on the inside of the wrist with extension piece 17 adjacent the thumb and aperture 16 aligned opposite the test region, so that the test artery constituted, in effect, a diameter across the aperture sight. Strap 10 was then locked on stud 18 through a perforation chosen so that the harness took a snug, nonslidable, yet comfortable, position on the wrist. It sometimes happens that attachment of the harness slides the subject's skin laterally of the underlying blood vessel, and it is therefore necessary to verify the correct relationship of the inked lines to the vessel as a final precaution. This is readily done by insertion of a finger tip through aperture 16, determining the vessel position by touch, and then sliding the skin back to its original superposed relationship if there has been relative displacement. The gimbaled housing-sensor assembly was next inserted within nipple 26 and the presser face of sensor 46 allowed to come to rest with aperature 62 centered on the test artery. This placement is greatly facilitated by the provision of the slide 25-stage 15 construction, which permits precise lateral positioning of slide 25 and attachments by appropriate adjustment of screw 30. Housing 35 was then slid inwardly within nipple 26 until contact was just made between the inside upper end of sensor-receiving cylinder 43 and sensor pressure-applying face 52, thus allowing a maximum range of travel under biasing pressure subsequently applied via nipple 51. Collar 27 was then screwed onto the threaded end of nipple 26, thereby locking sensor housing 35 and its appurtenances against longitudinal movement with respect to nipple 26 by circumferential contraction of the latter.

Biasing pressure was then applied by operation of a suitable valve, not shown, connected in circuit with the elastomeric tube supplying air under pressure to nipple 51. A good procedure, in this respect, was found to be the application of progressively higher biasing pressure, in approximately 2 p.s.i. increments, starting from about 6 p.s.i. as a minimum, until a further increase in biasing pressure produces no perceptible increase in pulse pressure, as indicated by the form of a wave output obtained with an oscilloscope or, preferably, on a conventional chart recorder. The true, absolute pulse pressure is defined as the difference between the systolic, or peak, pressure reading and the diastolic, or valley, pressure reading, as shown on the blood pressure trace reproduction of FIG. 4(C).

Corroboration of the lowest operable, and therefore most sensitive, biasing pressure application can be obtained by slowly turning screw 30 first one-half turn in advance out of its preset mid-position, followed by one-half turn in retraction. If this produces no perceptible effect on the recorded blood pressure value, the biasing pressure is preferably gradually reduced to a level where the corroborative check first reveals an effect on the measurement obtained. When this level is established, biasing pressure is maintained constant slightly thereabove by a conventional pressure regulator connected in the supply line circuit, and accurate blood pressure monitoring of long duration is then practicable without further attention to biasing pressure.

The gimbal mount of this invention has demonstrated its value in blood pressure measurements effected through the outside skin of individuals engaged in limited arm movements of the type which are required of astronauts in navigational activities required in space vehicle flights.

FIG. 4 constitutes comparative blood pressure traces obtained with the gimbal mount, fluid pressure-biased sensor construction of blood pressure measuring devices hereinbefore described.

Referring to FIG. 4, both of the traces shown were obtained on the same individual, that denoted C, with pulse rate of 72/min. being the record of pulse action at rest, whereas that denoted D is the corresponding record obtained while operating a bicycle ergometer, under which conditions the pulse rate rose to 128/min. and the pulse pressure increased approximately 35%. The gradual periodic vertical displacement of trace envelopes in both instances is the result of respiratory action (i.e., respiratory sinus arrythmia), and is a normal phenomenon. There occurred nothing whatever in the traces secured which indicated any interference from the bodily movements which accompanied the fairly strenuous cycling activity.

Operating experience has revealed that gimbal mounting of the sensor confers greatly improved insensitivity to environmental interference previously encountered. The reason for this seems to be that the sensor is entirely free to shift position through an appreciable solid angle of approximately 30 degrees in terms of the scope of sensor end movement referred to the plane of the gimbal axes. This permits nearly frictionless following of movement of the sensor presser face in the preservation of its conformal relationship with respect to a blood vessel, even under the severe conditions when the vessel has been found to have slid sideways to an appreciable extent. The maximum benefits of the construction are obtained when the gimbal axes are coplanar; however, noticeable advantage results even when the gimbal axes lie in different planes transverse the housing bore and it is therefore intended to include this construction also within the claim coverage.

Referring to FIG. 5, there is shown a design of tonometer embodying this invention, which devices are employed for the measurement of intraocular pressure, i.e., pressure existing within the eyeball, in the testing for eye diseases such as glaucoma. In this service, which is of relatively short duration, the presser of the test instrument is held against the subject's eye manually by the medical practitioner, and so a relatively long pencil-like tubular body 70 is provided for easy manipulation between the thumb and the index and middle fingers. A collar 71 attached to the barrel by set screw 72 provides a shoulder assisting manual dexterity in the user.

The forward end of tubular body 70 is drawn-down slightly and a gimbal mount, denoted generally at 73, provided therein in all respects similar to that hereinbefore described with reference to the blood pressure measuring device of FIGS. 1-3, inclusive. The sensor 74 is identical in construction with that hereinbefore described, the rubber diaphragm at the end being omitted from the FIG. 5 showing; however, since there is no advantage in longitudinal sensor biasing in the eye service contemplated, the inner gimbal axis is journaled in the sensor element directly, making it possible to use a relatively small overall size of sensor, typically ⅛″ maximum dia. x ⅛″ long. Sensor pressure maintenance and measurement tubing 75 and 76, respectively, are housed within tube 70 and passed collectively through a common conduit 77 into sensor 74. The remote ends of these tubes are drawn out of holes 79 and 80 drilled in base cap 81 and tube 76 run to a suitable transducer, such as that taught in U.S. Patent 3,099,262, for example.

In use, the practitioner grasps the tonometer by finger grip on tubular body 70 and moves it generally normally towards the eyeball in test, bringing the presser face 74a of sensor 74 into firm contact with the white part of the eyeball while applying a steadily increasing force which is periodically discontinued. This operation is repeated several times. The gimbaled construction permits the presser face of sensor 74 to repetitively assume a condition of flatness against the eyeball surface, with complete bridging of the presser face aperture by eye tissue during each application. Highly reproducible recorder-chart readings of intraocular pressure are thus obtained for each successive application of the tonometer to the eye.

From the foregoing, it will be understood that this invention can be modified relatively widely within the skill of the art without departure from its essential spirit, and it is accordingly intended to be limited only by the scope of the following claims.

What is claimed is:
1. A mount for a physiologic fluid pressure sensor comprising, in combination, a rigid housing provided with a through-going bore, a physiologic fluid pressure sensor terminating in a substantially flat presser face formed at right angles to the longitudinal axis of said sensor adapted to contact the body member within which physiologic fluid pressure measurement is to be effected, said sensor incorporating as fluid pressure sensing element a nozzle supplied with fluid at substantially constant pressure, said nozzle at the open outboard end being disposed concentric within a circular flow-throttling aperture discharging to exhaust cut through said flat presser face, and a gimbal ring sensor retainer disposed intermediate said bore and said sensor journaled transverse said bore on the outer gimbal axis, with the inner gimbal axis, reserved to sensor retention, oriented perpendicularly to said outer gimbal axis, said gimbal ring sensor retainer spacing said sensor radially with respect to said bore in the plane of said outer gimbal axis.

2. A mount for a physiologic fluid pressure sensor according to claim 1 wherein said sensor is slidably guided within said gimbal ring sensor retainer and said mount is provided with means for biasing said sensor axially of said gimbal ring sensor retainer under a preselected pressure loading.

3. A mount for a physiologic fluid pressure sensor comprising, in combination, a rigid housing provided with a through-going bore, a physiologic fluid pressure sensor terminating in a substantially flat presser face formed at right angles to the longitudinal axis of said sensor adapted to contact the body member within which physiologic fluid pressure measurement is to be effected, said sensor incorporating as fluid pressure sensing element a nozzle supplied with fluid at substantially constant pressure, said nozzle at the open outboard end being disposed concentric within a circular flow-throttling aperture discharging to exhaust cut through said flat presser face, and a gimbal ring sensor retainer disposed intermediate said bore and said sensor journaled within said bore on mutually perpendicular axes lying in a common plane transverse said bore, said gimbal ring sensor retainer spacing said sensor radially with respect to said bore at said common plane.

References Cited by the Examiner

UNITED STATES PATENTS

| 2,780,221 | 2/1957 | Posner | 128—2 |
| 3,049,001 | 8/1962 | MacKay et al. | 128—2 X |
| 3,099,262 | 7/1963 | Bigliano | 128—2.05 |
| 3,233,041 | 2/1966 | Croslin | 128—2.05 X |

FOREIGN PATENTS

| 748,282 | 4/1956 | Great Britain. |

RICHARD A. GAUDET, *Primary Examiner.*

SIMON BRODER, *Examiner.*